US008488604B2

(12) United States Patent
Du (10) Patent No.: US 8,488,604 B2
(45) Date of Patent: Jul. 16, 2013

(54) METHOD, DEVICE AND SYSTEM FOR FORWARDING MULTICAST PACKETS

(75) Inventor: Wenhua Du, Shenzhen (CN)

(73) Assignee: Huawei Technologies, Co., Ltd., Shenzhen (CN)

( * ) Notice: Subject to any disclaimer, the term of this patent is extended or adjusted under 35 U.S.C. 154(b) by 163 days.

(21) Appl. No.: 13/016,696

(22) Filed: Jan. 28, 2011

(65) Prior Publication Data

US 2011/0188500 A1  Aug. 4, 2011

(30) Foreign Application Priority Data

Jan. 29, 2010 (CN) .......................... 2010 1 0104815

(51) Int. Cl.
*H04L 12/54* (2006.01)
(52) U.S. Cl.
USPC ............ 370/390; 370/392; 370/432; 709/245
(58) Field of Classification Search
None
See application file for complete search history.

(56) References Cited

U.S. PATENT DOCUMENTS

| 5,917,819 | A | 6/1999 | Yang et al. | |
|---|---|---|---|---|
| 6,216,167 | B1 | 4/2001 | Momirov | |
| 7,184,440 | B1* | 2/2007 | Sterne et al. | 370/395.52 |
| 7,701,939 | B2* | 4/2010 | Tanaka | 370/390 |
| 2003/0002506 | A1* | 1/2003 | Moriwaki et al. | 370/392 |
| 2003/0021276 | A1* | 1/2003 | Lee | 370/395.1 |
| 2003/0147387 | A1* | 8/2003 | Devi et al. | 370/390 |
| 2006/0165098 | A1* | 7/2006 | Varma | 370/397 |
| 2006/0222012 | A1* | 10/2006 | Bhargava et al. | 370/473 |
| 2009/0059924 | A1* | 3/2009 | Muramoto et al. | 370/390 |
| 2010/0002703 | A1* | 1/2010 | Kogata et al. | 370/392 |
| 2011/0170542 | A1* | 7/2011 | Liu et al. | 370/390 |

FOREIGN PATENT DOCUMENTS

EP        1176771 A2     1/2002

OTHER PUBLICATIONS

Extended European Search Report issued in corresponding European Patent Application No. 11152484.9, mailed May 4, 2011.
Duchow et al., "Efficient Port-Based Network Access Control for IP DSLAMS In Ethernet-Based Fixed Access Networks", 2006. XP-002633821.
Li et al., "Design and Implementation of the Scalable Multicast Balanced Gamma (BG) Switch", Computer Communications and Networks, 2002. XP-10610929A.
Office Action issued in corresponding Chinese Patent Application No. 201010104815.6, mailed Nov. 16, 2011.
Office Action issued in corresponding European Patent Application No. 11152484.9, mailed Apr. 24, 2012.

(Continued)

*Primary Examiner* — Hassan Phillips
*Assistant Examiner* — Duc Duong
(74) *Attorney, Agent, or Firm* — Conley Rose, P.C.; Grant Rodolph; Nicholas K. Beaulieu (57) ABSTRACT

In the field of switching networks, a method, a device and a system for forwarding multicast packets are disclosed, which significantly reduce the requirement on the storage capacity of the switching network, thus implementing forwarding of a large number of multicast packets. The method includes: receiving a multicast packet, and a first forwarding identifier and a second forwarding identifier of the multicast packet; obtaining a destination line card corresponding to the multicast packet according to the first forwarding identifier; and forwarding the multicast packet and the second forwarding identifier to the destination line card. The method, device and system for forwarding multicast packets are applicable to situations where it is required to forward multicast packets in a single-level switching network or a multi-level switching network.

10 Claims, 3 Drawing Sheets

OTHER PUBLICATIONS

Communication from a foreign counterpart application, Chinese Application No. 201010104815.6, Partial English Translation, Office Action dated Aug. 21, 2012, 7 pages.

Communication from a foreign counterpart application, Chinese Application No. 201010104815.6, Office Action dated Aug. 21, 2012, 6 pages.

Foreign Communication from a counterpart application, Chinese Application No. 201010104815.6, Chinese Office Action dated Dec. 28, 2012, 10 pages.

Foreign Communication from a counterpart application, Chinese Application No. 201010104815.6, Partial Translation of Chinese Office Action dated Dec. 28, 2012, 13 pages.

* cited by examiner

METHOD, DEVICE AND SYSTEM FOR FORWARDING MULTICAST PACKETS

CROSS-REFERENCE TO RELATED APPLICATION

This application claims priority to Chinese Patent Application No. 201010104815.6, filed on Jan. 29, 2010, which is hereby incorporated by reference in its entirety.

FIELD OF THE INVENTION

The present invention relates to the field of switching networks, and in particular, to a method, a device and a system for forwarding multicast packets.

BACKGROUND OF THE INVENTION

A switching network in the prior art can provide unicast services and multicast services. The unicast services are point-to-point services, for example, an Internet access service is a common unicast service. The multicast services are point-to-multipoint services, and common multicast services include an Internet Protocol Television (IPTV) service and a Layer 2 multipoint Virtual Private Network (VPN) service, such as a Virtual Private Lan Service (VPLS) service. As the multicast services gradually rise, it becomes a hot research spot.

Take the IPTV service as an example. When multicast packets are forwarded, one channel represents one multicast data stream and one multicast data stream is indicated by one Multicast Group Identifier (MID). Viewers who watch the channels (may be called "multicast group members") may be different, the viewers are connected to different physical ports of a network device, and the network device forwards in distinction each multicast data stream in order to avoid wasting bandwidth. For example, if the physical port is the one indicated by the MID, a multicast packet is sent to the physical port; otherwise, no multicast packet is sent to the physical port.

The prior art provides a method for implementing multicast packet forwarding by a two-stage replication technology using the same MID. After receiving a multicast packet, a line card obtains the MID of the multicast packet by looking up a table, and then the line card sends the multicast packet together with the MID to a switch fabric card. The switch fabric card performs first stage replication, in which the switch fabric card uses the MID as an index to look up a multicast replication table saved therein, obtains line cards corresponding to the multicast packet, and sends the multicast packet and the MID to the line cards. The line cards perform second stage replication, in which the line cards use the MID as an index to look up a multicast replication table saved therein, obtain physical ports corresponding to the multicast packet, and send the multicast packet to each physical port indicated by the MID.

In the implementation of the present invention, the inventor finds that the prior art at least has the following problems. In the current multicast services, the required number of the multicast groups is increasingly growing, for example, up to 1 M (million) multicast groups. At this time, the capacity of a multicast replication table saved by a switch fabric card also becomes increasingly larger. For example, in a system with 1 M multicast groups and 64 line cards, the required capacity of the multicast replication table is 1 M*64 bit=64 Mbit. However, the storage capacity of the switch fabric card is merely tens of K, which can hardly meet the requirement, thus failing to implement multicast packet forwarding.

SUMMARY OF THE INVENTION

In order to solve the problems in the prior art, the present invention is directed to a method, a device and a system for forwarding multicast packets.

In order to achieve the above objectives, the present invention adopts the following technical solutions.

A method for forwarding multicast packets is provided, which includes:

receiving a multicast packet, and a first forwarding identifier and a second forwarding identifier of the multicast packet;

obtaining a destination line card corresponding to the multicast packet according to the first forwarding identifier; and forwarding the multicast packet and the second forwarding identifier to the destination line card, in order that the destination line card obtains a port corresponding to the multicast packet according to the second forwarding identifier.

A network device is provided, which includes:

a receiving unit, configured to receive a multicast packet, and a first forwarding identifier and a second forwarding identifier of the multicast packet;

a line card obtaining unit, configured to obtain a destination line card corresponding to the multicast packet according to the first forwarding identifier received by the receiving unit; and a forwarding unit, configured to forward the multicast packet and the second forwarding identifier to the destination line card, in order that the destination line card obtains a port corresponding to the multicast packet according to the second forwarding identifier.

A switching system is further provided. The system includes at least one line card which includes destination line cards. The system further includes at least one network device.

The network device is configured to receive a multicast packet, and a first forwarding identifier and a second forwarding identifier of the multicast packet, obtain a destination line card corresponding to the multicast packet according to the first forwarding identifier, and forward the multicast packet and the second forwarding identifier to the destination line card, in order that the destination line card obtains a port corresponding to the multicast packet according to the second forwarding identifier. The destination line card is configured to obtain the port corresponding to the multicast packet according to the second forwarding identifier, and forward the multicast packet to the port.

The technical solutions of the present invention use two identifiers to implement multicast packet forwarding. The first forwarding identifier is configured to obtain the destination line card corresponding to the multicast packet, and the second forwarding identifier is configured to obtain the port corresponding to the multicast packet. By controlling the number of the first forwarding identifiers, the capacity of a multicast replication table saved by a switching network can be reduced. The technical solutions of the present invention remove the redundant data stored repeatedly in the switching network, and reduce the requirement on the storage capacity of the switching network, thus implementing forwarding of a large number of multicast packets.

DETAILED DESCRIPTION OF THE DRAWINGS

To illustrate the technical solution according to the embodiments of the present invention or in the prior art more clearly, the accompanying drawings for describing the embodiments or the prior art are given briefly below. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

The technical solutions of the present invention are elaborated below with reference to accompanying drawings. Evidently, the embodiments described below are for the exemplary purpose only, without covering all embodiments of the present invention. Persons of ordinary skill in the art can derive other embodiments from the embodiments given herein without making any creative effort, and all such embodiments are covered in the protection scope of the present invention.

Figure 1:
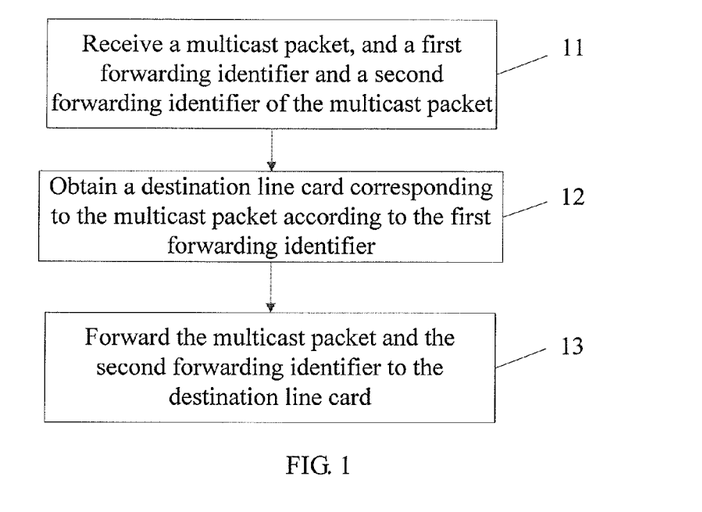
FIG. 1 is a schematic flow chart of a method for forwarding multicast packets according to an embodiment of the present invention.

According to an embodiment of the present invention, a method for forwarding multicast packets is provided. Referring to FIG. 1, the method includes:

Step 11: receiving a multicast packet, and a first forwarding identifier and a second forwarding identifier of the multicast packet;

Step 12: obtaining a destination line card corresponding to the multicast packet according to the first forwarding identifier; and Step 13: forwarding the multicast packet and the second forwarding identifier to the destination line card, in order that the destination line card obtains a port corresponding to the multicast packet according to the second forwarding identifier.

In order to describe clearly the technical solutions of the present invention, in the embodiments of the present invention, the terms "first" and "second" are used to distinguish the same items or similar items with basically the same function and effect.

The Steps 11 to 13 can be implemented by a switching network. After the Step 13, an embodiment of the present invention further includes: forwarding, by the destination line card, the multicast packet to the corresponding port by using the received second forwarding identifier, in which, the port may be a physical port or logical port. The first forwarding identifier is a newly added identifier, and an existing MID may be used as the second forwarding identifier.

The number of the first forwarding identifiers is controlled according to the capacity of the switching network, and the first forwarding identifier may be set in various manners. In an embodiment, when the storage capacity of the switching network is very limited, all the multicast packets with the same destination line card have the same first forwarding identifier, or when the storage capacity of the switching network is abundant, all the multicast packets with the same destination line card are divided into several groups, and the same first forwarding identifier is set for the multicast packets in each group.

The technical solution according to the embodiment of the present invention uses two identifiers to implement multicast packet forwarding. The first forwarding identifier is configured to obtain the destination line card corresponding to the multicast packet, and the second forwarding identifier is configured to obtain the port corresponding to the multicast packet. By controlling the number of the first forwarding identifiers, the capacity of a multicast replication table saved by the switching network can be significantly reduced. The technical solution according to the embodiment of the present invention significantly reduces the requirement on the storage capacity of the switching network, thus implementing forwarding of a large number of multicast packets.

Another embodiment of the present invention provides a method for forwarding multicast packets, which is described in detail in the following.

The embodiment of the present invention is described by taking a scenario where a switching network implements multicast packet forwarding through switch fabric cards as an example, but the present invention is not limited thereto, and other functional modules or other chips integrated with switch fabric cards may be used to implement multicast packet forwarding. In the embodiment of the present invention, the replication function of switch fabric cards and the replication function of line cards are decoupled, and compared with the processing method in the prior art that the same identifier is used to control two-stage replication, different identifiers are used to control the switch fabric cards and the line cards respectively. the number of the identifiers of the switch fabric cards is small (for example, merely tens of K), and the number of the identifiers of the line cards is large (for example, 1 M), thus reducing the requirement on the capacity of the switch fabric cards.

Because data on the line cards is stored on an off-chip Random Access Memory (RAM), such as a Dynamic Random Access Memory (DRAM) or Static Random Access Memory (SRAM), it is no doubt that identifier information required by 1 M multicast packets can be stored. The present invention dose not adopt the processing method of setting an off-chip RAM for the switch fabric cards, because this solution leads to a high cost, increases the volume occupied by the board and reduces the device integration.

Figure 2:
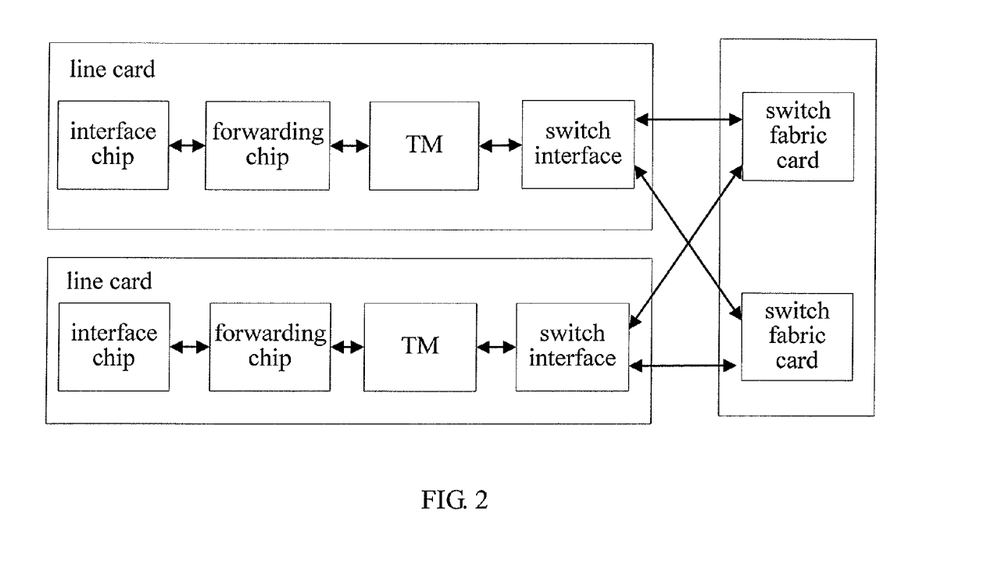
FIG. 2 is a schematic structural view of a router for implementing multicast packet forwarding according to another embodiment of the present invention.

Multicast packet forwarding may be implemented through a network device with internal switch fabric cards, such as a router or an Ethernet switch in the embodiment of the present invention. FIG. 2 is a schematic structural view of a router according to an embodiment of the present invention. Referring to FIG. 2, the router includes several line cards and switch fabric cards, in which the switch fabric cards interconnect the line cards, and may be implemented through an independent board or by integrating on a main control chip of the router.

Figure 3:
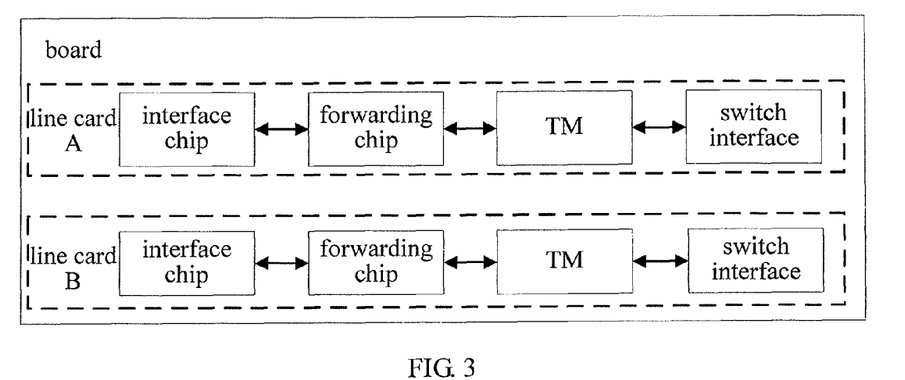
FIG. 3 is a schematic view of an implementation of a line card according to another embodiment of the present invention.

One line card or more line cards may be set on one board. Referring to FIG. 3, line card A and line card B are set on one board. One line card provides one or more physical ports, or may provide one or more logical ports, and one physical port may contain a plurality of logical ports. The line cards receive or send data packets through physical ports and/or logical ports. The processing capability of the line cards is usually 10 Gbps or 40 Gbps, and common physical ports provided by the line cards include Gigabit Ethernet (GE) interface, LOGE, OC48 POS (Optical Carrier-48 Packet Over SONET), and OC192 POS.

When multicast packets are forwarded, the following steps are performed.

In Step S1, a line card at the input end sends a multicast packet and two forwarding identifiers to a switch fabric card.

It can be known through in-depth analysis that, in the process of two-stage replication during multicast packet forwarding, the switching network needs to know the destination line card corresponding to all multicast packet members of one multicast group, and the destination line card needs to know a set of physical ports and/or logical ports corresponding to all multicast packet members of one multicast group. Because the number of the line cards is one or two orders of magnitude smaller than the number of the ports, the total number of the set of the destination line cards is much smaller than the total number of the set of the ports.

Therefore, corresponding to each multicast packet, two different identifiers are set for forwarding, for example, a first forwarding identifier expressed as MID_F and a second forwarding identifier expressed as MID_S. MID_F indicates the set of the destination line cards, MID_S indicates the set of the physical ports or logical ports, and the number of MID_F is much smaller than the number of MID_S. For example, as for a system with 1 M multicast packets and 64 line cards, if each multicast packet has one or more users on the 64 line cards (that is to say, each multicast packet has one or more ports on the 64 line cards), that is, the multicast packets have the same destination line cards, and one or more users on the line cards are distributed randomly in the 48 GE interfaces. At this time, the number of MID_F is one (indicating broadcast to 64 line cards), and the number of MID_S is at most 1 M (if every port is different, the number of MID_S is the most, 1 M; if not every point is different, the number of MID_S is smaller than 1 M).

After the line card at the input end receives the multicast packet, relevant data is looked up to obtain the first forwarding identifier and the second forwarding identifier, in which, the relevant data contains a corresponding relation between multicast packets, and first forwarding identifiers and second forwarding identifiers.

Two identifiers are set for the multicast packet in the embodiment of the present invention: the first forwarding identifier and the second forwarding identifier. The number of the first forwarding identifiers is controlled according to the capacity of the switching network, and the first forwarding identifier may be set in various manners. In an embodiment, when the storage capacity of the switching network is very limited, all the multicast packets with the same destination line card have the same first forwarding identifier, or when the storage capacity of the switching network is abundant, all the multicast packets with the same destination line card are divided into several groups, and the same first forwarding identifier is set for the multicast packets in each group.

An existing MID may be directly used as the second forwarding identifier.

In Step S2, the switch fabric card receives the multicast packet, and the first forwarding identifier and the second forwarding identifier of the multicast packet sent by the line card. The switch fabric card stores the multicast packet in one or more memories.

In Step S3, the switch fabric card obtains a destination line card corresponding to the multicast packet according to the first forwarding identifier, which includes at least the following two manners.

First Manner

The switch fabric card looks up a saved multicast replication table according to the first forwarding identifier, and obtains the destination line card corresponding to multicast packet, in which the multicast replication table indicates a corresponding relation between first forwarding identifiers and destination line cards.

In this manner, because a large number of data packets may correspond to the same destination line card, the destination line card corresponding to one MID_F only needs to be saved once in the multicast replication table, thus significantly reducing the storage space occupied by the multicast replication table.

Second Manner

When the first forwarding identifier is set, the destination line card corresponding to the multicast packet is directly indicated in the first forwarding identifier, and the switch fabric card directly obtains the destination line card corresponding to the multicast packet according to the first forwarding identifier.

The first forwarding identifier may be implemented by a bitmap or a link-list. For example, when the number of line cards in a router is 64, the first forwarding identifier (MID_F) may be replaced by one 64bit bitmap. When the nth bit of the bitmap is one, it means that the nth line card is a member of the multicast group. Thus, through the first forwarding identifier implemented by the bitmap, it can be known which line cards are the destination line cards of the current multicast packet.

In this manner, it is not required to set a multicast replication table for the switch fabric card, thus reducing the requirement on the storage capacity of the switching network to the maximum extent.

The switch fabric card extracts a multicast packet from a memory, replicates the multicast packet and then sends the multicast packet to the destination line cards.

In Step S4, the destination line card obtains a port corresponding to the multicast packet according to the second forwarding identifier (MID_S), and forwards the multicast packet to the port.

Each destination line card receives and stores the multicast packet sent by the switch fabric card. After the ports corresponding to the multicast packet are obtained, the multicast packet is replicated, and then the multicast packet is sent to the ports.

The ports may be physical ports or logical ports, such as Label Switch Tunnel (LST), QinQ ports or Virtual LAN (VLAN) ports. A physical port may contain a plurality of logical ports. If MID_S is implemented through an existing MID, the processing method of the Step S4 is the same as the processing method in the prior art when a line card receives a multicast packet and an MID.

Figure 4:
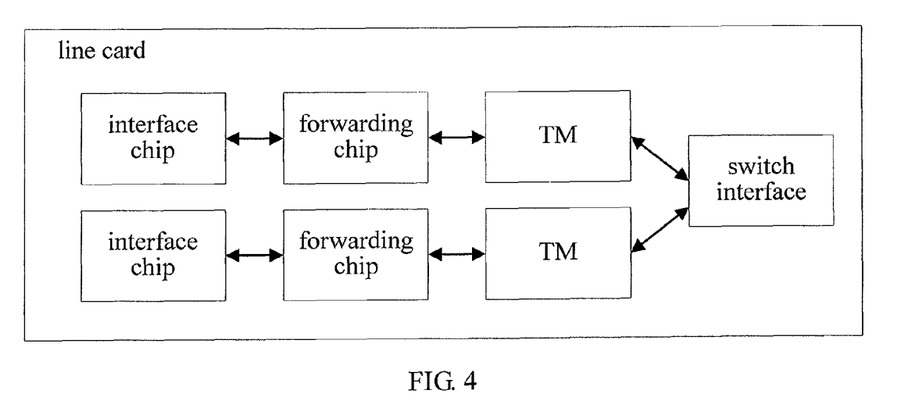
FIG. 4 is a schematic structural view of a line card having sub-line cards according to another embodiment of the present invention.

Further, some line cards have sub-line cards. Referring to FIG. 4, the line card includes two sets of interface chips (such as a framer), forwarding chips (such as a packet processor, PP), and traffic management (TM) chips, which share a switch interface, that is, the line card has two sub-line cards.

At this time, the destination line card needs to find the destination sub-line card corresponding to the multicast packet. In this case, in order to ensure that the destination line card can find the corresponding destination sub-line card, when or after the switch fabric card obtains the destination line card corresponding to the multicast packet and forwards the multicast packet and the MID_S to the destination line card, the method further includes: forwarding, by the switch fabric card, the first forwarding identifier (MID_F) to the destination line card.

The destination line card first obtains the destination sub-line card according to MID_F, and then the destination sub-line card obtains a physical port or a logical port corresponding to the multicast packet according to MID_S, and forwards the multicast packet to the physical port or logical port.

The technical solution according to the embodiment of the present invention sets the same first forwarding identifier for the multicast packets with the same destination line cards by analyzing in depth the characteristics of the process of multicast packet forwarding and by using the feature that many multicast packets have the same destination line card in the first stage replication, and implements multicast packet forwarding by using the two-stage forwarding identifiers. The technical solution according to the embodiment of the present invention removes the redundant data stored repeatedly in the switching network, and significantly reduces the requirement on the storage capacity of the switching network, thus implementing forwarding of a large number of multicast packets.

Figure 5:
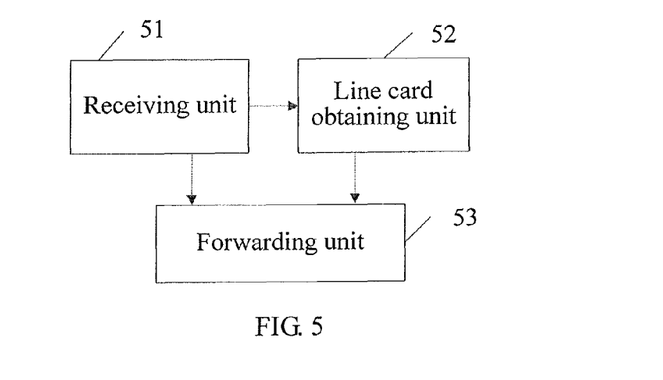
FIG. 5 is a schematic structural view of a network device according to yet another embodiment of the present invention.

According to yet another embodiment, a network device is further provided. Referring the FIG. 5, the device includes:

a receiving unit 51, configured to receive a multicast packet, and a first forwarding identifier and a second forwarding identifier of the multicast packet;

a line card obtaining unit 52, configured to obtain a destination line card corresponding to the multicast packet according to the first forwarding identifier received by the receiving unit 51; and a forwarding unit 53, configured to forward the multicast packet and the second forwarding identifier to the destination line card, in order that the destination line card obtains a port corresponding to the multicast packet according to the second forwarding identifier.

Because in the process of two-stage replication during multicast packet forwarding, a switching network needs to know the destination line card corresponding to all multicast packet members of one multicast group, and the destination line card needs to know a set of physical ports or logical ports corresponding to all multicast packet members of one multicast group. Because the number of the line cards is one or two orders of magnitude smaller than the number of the ports, the total number of the set of the destination line cards is much smaller than the total number of the set of the ports.

Therefore, in the embodiment of the present invention, corresponding to each multicast packet, two different identifiers are set for forwarding, for example, a first forwarding identifier expressed as MID_F and a second forwarding identifier expressed as MID_S. MID_F indicates the set of the destination line cards, MID_S indicates the set of the physical ports or logical ports, and the number of MID_F is much smaller than the number of MID_S.

Figure 6:
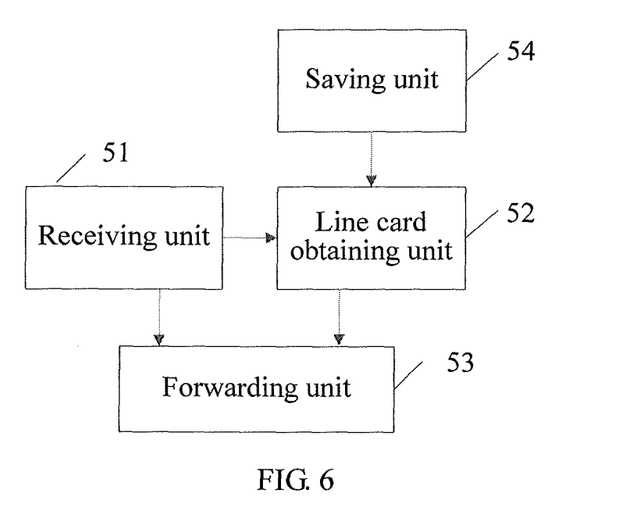
FIG. 6 is a schematic structural view of another network device according to yet another embodiment of the present invention.

Further, referring to FIG. 6, according to the different manners of obtaining the destination line card, the network device further includes:

a saving unit 54, configured to save a multicast replication table, in which the multicast replication table indicates a corresponding relation between first forwarding identifiers and destination line cards, and multicast packets with the same destination line card have the same first forwarding identifier.

At this time, the line card obtaining unit 52 is specifically configured to look up the multicast replication table saved by the saving unit according to the first forwarding identifier, and obtain the destination line card corresponding to the multicast packet.

Alternatively, when the first forwarding identifier is set, the destination line card corresponding to the multicast packet is directly indicated in the first forwarding identifier, and then the line card obtaining unit 52 directly obtains the destination line card corresponding to the multicast packet according to the first forwarding identifier. For example, the first forwarding identifier may be implemented by a bitmap or a link-list. At this time, the line card obtaining unit 52 is specifically configured to directly obtain the destination line card corresponding to the multicast packet according to the first forwarding identifier, in which the first forwarding identifier is implemented by a bitmap or a link-list.

Further, by analyzing in depth the characteristics of the process of multicast packet forwarding and by using the feature that many multicast packets have the same destination line card, the same first forwarding identifier may be set for the multicast packets with the same destination line card, so that the storage space occupied by the multicast replication table is greatly decreased, thus significantly reducing the requirement on the storage capacity of the switching network.

Figure 7:
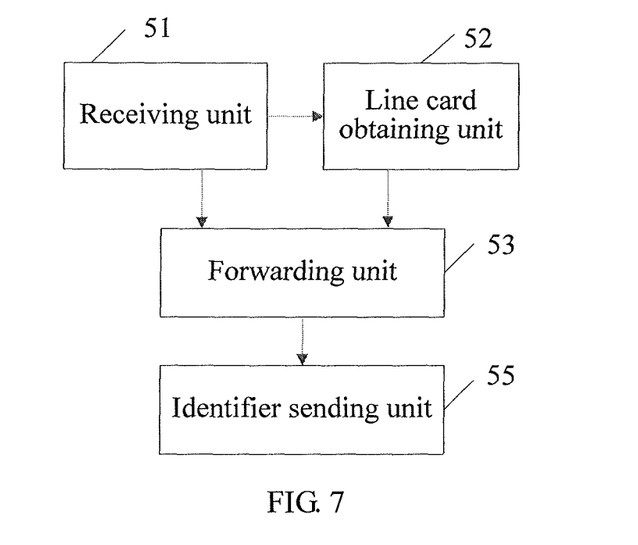
FIG. 7 is a schematic structural view of yet another network device according to yet another embodiment of the present invention.

The line card obtains the port corresponding to the multicast packet according to the second forwarding identifier, and forwards the multicast packet to the port. Further, when the line card has sub-line cards, the destination line card needs to find a destination sub-line card corresponding to the multicast packet first. In order to ensure that the destination line card can find the corresponding destination sub-line card, referring to FIG. 7, the switch fabric card further includes: an identifier sending unit 55, configured to forward the first forwarding identifier to the destination line card. At this time, the destination line card first obtains the destination sub-line card according to the first forwarding identifier, and then the destination sub-line card obtains a physical port or a logical port corresponding to the multicast packet according to the second forwarding identifier, and forwards the multicast packet to the physical port or logical port. At this time, the destination line card is configured to obtain the destination sub-line card according to the first forwarding identifier, and the destination sub-line card is configured to obtain the port corresponding to the multicast packet according to the second forwarding identifier and forward the multicast packet to the port.

As for the specific operation modes of functional modules and units in the device embedment of the present invention, reference is made to the method embodiments of the present invention. The functional modules and units in the device embodiment of the present invention may be implemented independently, or may be implemented by integrating in one or more units. For example, the network device may be implemented by the switch fabric cards.

The technical solution according to the embodiment of the present invention uses two identifiers to implement multicast packet forwarding. The first forwarding identifier is configured to obtain the destination line card corresponding to the multicast packet, and the second forwarding identifier is configured to obtain the port corresponding to the multicast packet. By controlling the number of the first forwarding identifiers, the capacity of the multicast replication table saved by the switching network can be significantly reduced. The technical solution according to the embodiment of the present invention removes the redundant data stored repeatedly in the switching network, and significantly reduces the requirement on the storage capacity of the switching network, thus implementing forwarding of a large number of multicast packets.

Figure 8:
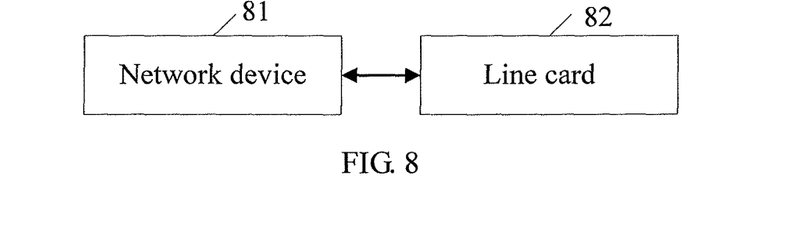
FIG. 8 is a schematic structural view of a switching system according to yet another embodiment of the present invention.

As shown in FIG. 8, according to yet another embodiment of the present invention, a switching system is provided, which includes at least one line card 82. The at least one line card includes destination line cards, that is, the at least one line card includes a destination line card corresponding to a multicast packet. The system further includes at least one network device 81.

The network device 81 is configured to receive a multicast packet, and a first forwarding identifier and a second forwarding identifier of the multicast packet, obtain a destination line card 82 corresponding to the multicast packet according to the first forwarding identifier, and forward the multicast packet and the second forwarding identifier to the destination line card 82, in order that the destination line card 82 obtains a port corresponding to the multicast packet according to the second forwarding identifier.

The destination line card 82 is further configured to obtain the port corresponding to the multicast packet according to the second forwarding identifier, and forward the multicast packet to the port.

Further, the network device 81 is further configured to forward the first forwarding identifier to the destination line card.

The destination line card 82 includes destination sub-line cards, and is configured to obtain a destination sub-line card according to the first forwarding identifier. The destination sub-line card is configured to obtain the port corresponding to the multicast packet according to the second forwarding identifier and forward the multicast packet to the port.

The technical solution according to the embodiment of the present invention uses two identifiers to implement multicast packet forwarding. The first forwarding identifier is configured to obtain the destination line card corresponding to the multicast packet, and the second forwarding identifier is configured to obtain the port corresponding to the multicast packet. By controlling the number of the first forwarding identifiers, the capacity of a multicast replication table saved by a switching network can be significantly reduced.

The technical solution according to the embodiment of the present invention removes the redundant data stored repeatedly in the switching network, and significantly reduces the requirement on the storage capacity of the switching network, thus implementing forwarding of a large number of multicast packets.

It is clear to persons skilled in the art that the present invention may be accomplished through software plus a necessary universal hardware platform. Based on this, the technical solutions of the present invention or the part that makes contributions to the prior art can be substantially embodied in the form of a software product. The computer software product may be stored in a storage medium, such as a Read-Only Memory/Random Access Memory (ROM/RAM), a magnetic disk or an optical disk, an d contain several instructions configured to instruct a computer device (for example, a personal computer, a server, or a network device) to perform the method described in the embodiments of the present invention or in some parts of the embodiments.

The above descriptions are merely specific embodiments of the present invention, but not intended to limit the protection scope of the present invention. Any variations or replacements that can be easily thought of by persons skilled in the art within the technical scope of the present invention shall fall within the protection scope of the present invention as defined by the appended claims.

What is claimed is:

1. A method for forwarding multicast packets, comprising:
receiving a multicast packet, a first forwarding identifier, and a second forwarding identifier of the multicast packet;
obtaining a destination line card corresponding to the multicast packet according to the first forwarding identifier; and
forwarding the multicast packet and the second forwarding identifier to the destination line card so that the destination line card obtains a port corresponding to the multicast packet according to the second forwarding identifier,
wherein during or after forwarding the multicast packet and the second forwarding identifier to the destination line card, the method further comprises:
forwarding the first forwarding identifier to the destination line card so that the destination line card obtains a destination sub-line card according to the first forwarding identifier; and
forwarding, by the destination sub-line card, the multicast packet to the port corresponding to the multicast packet, wherein the port corresponding to the multicast packet is obtained by the destination sub-line card according to the second forwarding identifier, and wherein the destination line card comprises at least two destination sub-line cards.

2. The method according to claim 1, wherein obtaining the destination line card corresponding to the multicast packet according to the first forwarding identifier comprises:
looking up a saved multicast replication table according to the first forwarding identifier; and
obtaining the destination line card corresponding to the multicast packet,
wherein the multicast replication table indicates a corresponding relation between first forwarding identifiers and destination line cards.

3. The method according to claim 1, wherein after forwarding the multicast packet and the second forwarding identifier to the destination line card, the method further comprises:
obtaining, by the destination line card, the port corresponding to the multicast packet according to the second forwarding identifier; and
forwarding the multicast packet to the port.

4. The method according to claim 1, wherein multicast packets with a same destination line card have a same first forwarding identifier.

5. The method according to claim 1, wherein obtaining the destination line card corresponding to the multicast packet according to the first forwarding identifier comprises directly obtaining the destination line card corresponding to the multicast packet according to the first forwarding identifier, wherein the first forwarding identifier is implemented by a bitmap or a link-list.

6. A network device, comprising:
a receiving unit configured to receive a multicast packet, a first forwarding identifier, and a second forwarding identifier of the multicast packet;
a line card obtaining unit configured to obtain a destination line card corresponding to the multicast packet according to the first forwarding identifier received by the receiving unit; and a forwarding unit configured to forward the multicast packet and the second forwarding identifier to the destination line card so that the destination line card obtains a port corresponding to the multicast packet according to the second forwarding identifier; and an identifier sending unit configured to forward the first forwarding identifier to the destination line card so that when the destination line card includes destination sub-line cards, a destination sub-line card is obtained according to the first forwarding identifier and the multicast packet is forwarded by the destination sub-line card to the port corresponding to the multicast packet, wherein the port corresponding to the multicast packet is obtained by the destination sub-line card according to the second forwarding identifier, and wherein the destination line card comprises at least two destination sub-line cards.

7. The network device according to claim 6, further comprising a saving unit configured to save a multicast replication table, wherein the multicast replication table indicates a corresponding relation between first forwarding identifiers and destination line cards, wherein multicast packets with a same destination line card have a same first forwarding identifier, and wherein the line card obtaining unit is configured to look up the multicast replication table saved by the saving unit according to the first forwarding identifier and obtain the destination line card corresponding to the multicast packet.

8. The network device according to claim 6, wherein the line card obtaining unit is configured to directly obtain the destination line card corresponding to the multicast packet according to the first forwarding identifier, and wherein the first forwarding identifier is implemented by a bitmap or a link-list.

9. A switching system, comprising:

a plurality of line cards, wherein the line cards comprise destination line cards; and at least one network device, wherein the network device is configured to receive a multicast packet, a first forwarding identifier, and a second forwarding identifier of the multicast packet, obtain a destination line card corresponding to the multicast packet according to the first forwarding identifier, and forward the multicast packet and the second forwarding identifier to the destination line card so that the destination line card obtains a port corresponding to the multicast packet according to the second forwarding identifier, wherein the destination line card is configured to obtain the port corresponding to the multicast packet according to the second forwarding identifier and forward the multicast packet to the port, wherein the network device is further configured to forward the first forwarding identifier to the destination line card, wherein the destination line card comprises destination sub-line cards and is configured to obtain a destination sub-line card according to the first forwarding identifier, and wherein the destination sub-line card is configured to obtain the port corresponding to the multicast packet according to the second forwarding identifier and forward the multicast packet to the port.

10. The system according to claim 9, wherein multicast packets with the same destination line card have the same first forwarding identifier.

* * * * *

UNITED STATES PATENT AND TRADEMARK OFFICE
CERTIFICATE OF CORRECTION

PATENT NO. : 8,488,604 B2
APPLICATION NO. : 13/016696
DATED : July 16, 2013
INVENTOR(S) : Wenhua Du It is certified that error appears in the above-identified patent and that said Letters Patent is hereby corrected as shown below:

In the Claims

Column 10 Line 60 through Column 11 Line 17 - Claim 6 should read as follows:

6. A network device, comprising:
a receiving unit configured to receive a multicast packet, a first forwarding identifier, and a second forwarding identifier of the multicast packet;
a line card obtaining unit configured to obtain a destination line card corresponding to the multicast packet according to the first forwarding identifier received by the receiving unit;
a forwarding unit configured to forward the multicast packet and the second forwarding identifier to the destination line card so that the destination line card obtains a port corresponding to the multicast packet according to the second forwarding identifier; and
an identifier sending unit configured to forward the first forwarding identifier to the destination line card so that when the destination line card includes destination sub-line cards, a destination sub-line card is obtained according to the first forwarding identifier and the multicast packet is forwarded by the destination sub-line card to the port corresponding to the multicast packet,
wherein the port corresponding to the multicast packet is obtained by the destination sub-line card according to the second forwarding identifier, and
wherein the destination line card comprises at least two destination sub-line cards.

Signed and Sealed this
Seventeenth Day of September, 2013

Teresa Stanek Rea
*Deputy Director of the United States Patent and Trademark Office*